(12) United States Patent
Nakamura et al.

(10) Patent No.: US 7,212,980 B2
(45) Date of Patent: May 1, 2007

(54) TRIAL MANAGEMENT SYSTEM, PROGRAM, AND COMPUTER READABLE RECORDING MEDIUM RECORDING THE PROGRAM

(75) Inventors: Masakatsu Nakamura, Kashihara (JP); Yasuhiro Nakai, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1056 days.

(21) Appl. No.: 10/035,244

(22) Filed: Jan. 4, 2002

(65) Prior Publication Data

US 2002/0143568 A1    Oct. 3, 2002

(30) Foreign Application Priority Data

Mar. 27, 2001    (JP)    ............... 2001-091013

(51) Int. Cl.
   *H04L 9/00* (2006.01)
(52) U.S. Cl. .......................................... 705/1; 713/182
(58) Field of Classification Search ................. 713/182
   See application file for complete search history.

(56) References Cited

U.S. PATENT DOCUMENTS

| 5,109,434 A | * | 4/1992 | Shimizu et al. ............. 382/276 |
| 5,523,859 A | * | 6/1996 | Nakajima et al. ........... 358/444 |
| 5,564,038 A |   | 10/1996 | Grantz et al. |
| 6,195,171 B1 | * | 2/2001 | Ochiai ....................... 358/1.15 |
| 6,236,464 B1 | * | 5/2001 | Kohtani et al. ............ 358/1.15 |
| 6,246,769 B1 | * | 6/2001 | Kohut ........................ 380/45 |
| 6,442,595 B1 | * | 8/2002 | Kelly ......................... 709/206 |
| 6,490,684 B1 | * | 12/2002 | Fenstemaker et al. ...... 713/182 |
| 6,609,253 B1 | * | 8/2003 | Swix et al. .................. 725/88 |
| 6,654,888 B1 | * | 11/2003 | Cooper et al. .............. 713/190 |

FOREIGN PATENT DOCUMENTS

| EP | 1 031 907 A  |   | 8/2000 |
| EP | 1 031 907 A2 | * | 8/2000 |
| JP | 04 054529    |   | 2/1992 |
| JP | 08-194748    |   | 7/1996 |
| JP | 9-297682     |   | 11/1997 |
| JP | 2000-250750  |   | 9/2000 |

OTHER PUBLICATIONS

Lieberman, Brett, "Juno to Provide New Web // Internet Access to Be Combined With Free E-mail," The Patriot-News, Final Edition, Harrisburg, PA, Jul. 28, 1998, p. D.02.*
Webster's II Dictionary, Third Edition, Office Edition, Houghton Mifflin Company, New York, 2005, p. 554.*

* cited by examiner

*Primary Examiner*—John W. Hayes
*Assistant Examiner*—Nathan H. Erb
(74) *Attorney, Agent, or Firm*—Nixon & Vanderhye PC

(57) ABSTRACT

Upgradable functions which are to be a target of trial are previously stored as software (program) or hardware in a storage section of a system. When a user desires to try out the functions, the user gives an instruction to do so to the system via a display panel or the like. The system, upon receipt of the instruction (including the start, termination, extension of a period, etc., of a trial), provides the target functions as required, thus providing the trial of a functionally upgraded, new system to users more easily and flexibly than ever before.

25 Claims, 12 Drawing Sheets

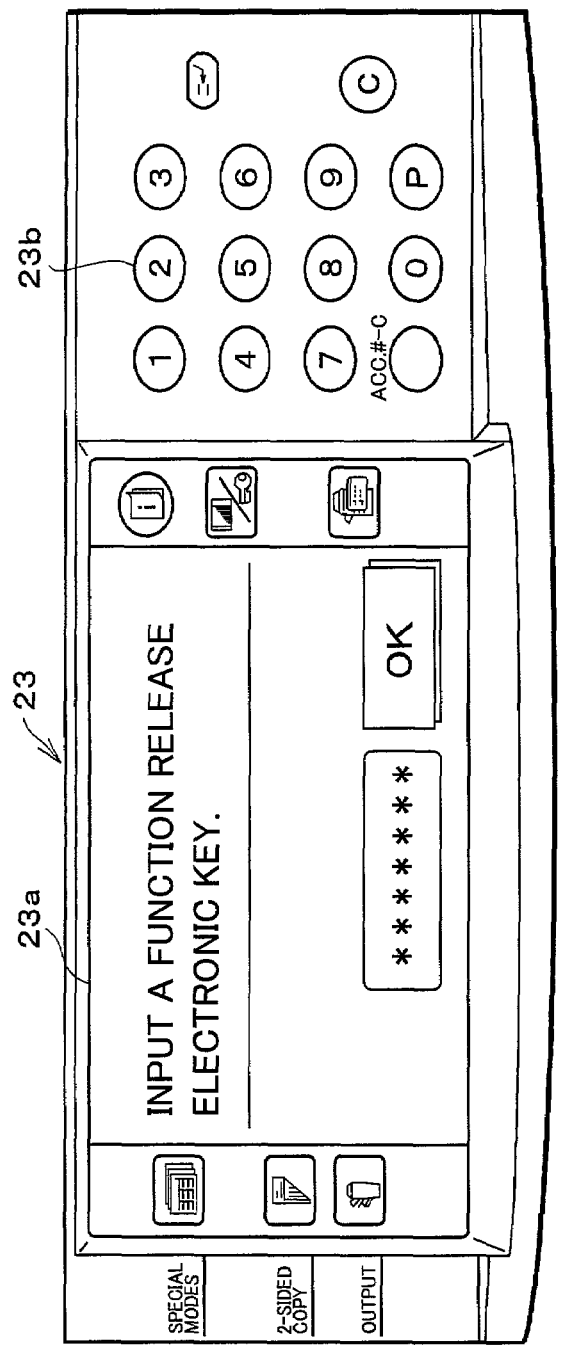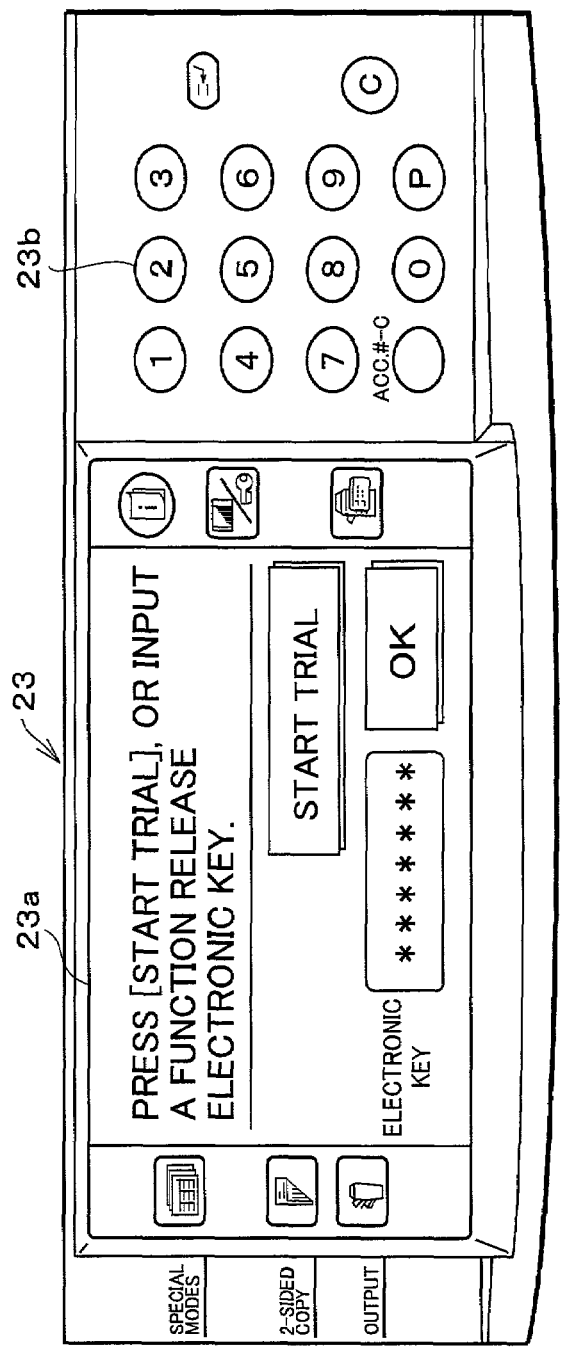
FIG. 4 (a)
FIG. 4 (b)

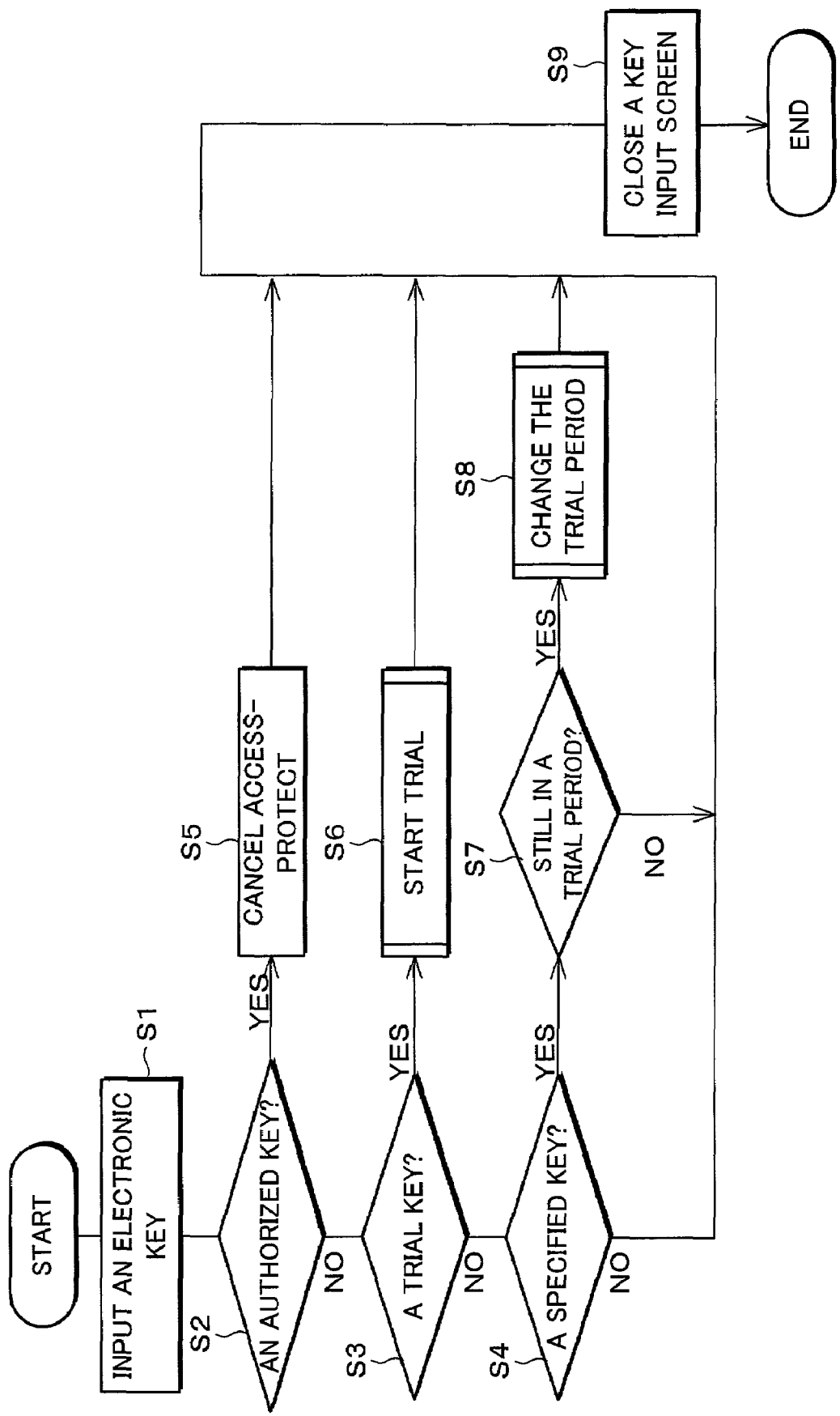

TRIAL MANAGEMENT SYSTEM, PROGRAM, AND COMPUTER READABLE RECORDING MEDIUM RECORDING THE PROGRAM

FIELD OF THE INVENTION

The present invention relates to a trial management system, a program, and a computer-readable recording medium in which the program is recorded, which are capable of managing a trial of a program in a device, such as a copying machine or the like, which stores a plurality of function programs in advance.

BACKGROUND OF THE INVENTION

When the foregoing device is a copying machine for example, it is a service company or a distributor that takes charge of functional upgrading of a device after the shipment. The functional upgrading includes, for example, provision of additional devices such as an automatic document feeder, a discharge copy paper processing device and the like, depending on reasons such that a change is made in a user's use environment, the user demands additional functions, and the like.

At the time of such functional upgrading, there may be a case where the original program requires addition of, rewriting as, or replacement with a new program, in addition to the provision of the additional devices to the device. Under such circumstances, conventionally, it was the job of a maintenance person (a serviceperson) to fulfil the foregoing requirements by, for example, installing a new system program so that it overwrites a previous system program which is under the management of a memory or hard disk, replacing the memory or hard disk managing the system program with a new memory or hard disk managing the new system program, and the like.

The foregoing conventional technique has a problem. When installation is carried out for the purpose of functional upgrading, complicated steps should be taken. Therefore, the installation should be carried out by a person who has professional techniques and expert knowledge on the structure of the devices.

On the other hand, when components such as a substrate, a memory and the like are replaced with the new ones for the purpose of functional upgrading, there too arises a problem that the expert knowledge and techniques are required in replacing steps. Another problem is that a manufacturer should stock a variety of substrates and memories, the initially installed basic programs of which respectively include one or a plurality of additional program(s) in combination. This increases the cost of components and requires operation check for each combination of programs. In addition, a user faces a problem of unnecessary components remaining unused after the functional upgrading. Further, there arises a problem that an unauthorized imitation substrate or memory is used, which hinders the manufacturer from obtaining a proper profit and may cause a mechanical failure.

As discussed, the conventionally taken step of shifting a system to a new, functionally upgraded one requires a certain cost and time. Therefore, it has been difficult to provide a user with a trial use of the new, functionally upgraded system.

SUMMARY OF THE INVENTION

It is therefore an object of the present invention to provide a trial management system, a program, and a computer readable recording medium recording the program, capable of providing a user with the trial of a functionally upgraded, new system more easily and flexibly than ever before.

In order to attain the foregoing object, a trial management system according to the present invention includes: a storage section storing one or more functions to be a target of trial; a trial instruction giving section for receiving a user's instruction on a trial period for said function; a specifying section for specifying a function, a trial of which is started, according to an instruction received by said trial instruction giving section; and a control section for setting a trial period for the function specified by said specifying section in accordance with the instruction received by said trial instruction giving section.

Further, in order to attain the foregoing object, a program according to the present invention causes a computer to function as a control section in the foregoing trial management system.

Further, in order to attain the foregoing object, a computer-readable recording medium storing a program according to the present invention stores the foregoing program.

With this arrangement, upgradable functions which are to be a target of trial are previously stored as software (program) or hardware in a storage section of a system. When a user desires to try out the functions, the user gives an instruction to do so to the system via a display panel or the like. The system, upon receipt of the instruction (including the start, termination, extension of a period, etc., of a trial), provides the target functions as required.

Accordingly, unlike upgrading by installation, functions can be upgraded with a simple procedure, and any professional techniques based on the understanding of a device configuration are not required. Moreover, unlike upgrading by the replacement of components such as a substrate, memory and the like, any professional techniques related to such replacement are not required, thereby providing users with the trial of a functionally upgraded, new system more easily and flexibly than ever before.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 4(*a*) and 4(*b*) show examples of a trial key input screen. FIG. 4(*a*) is an explanatory view showing an example of an input screen for an electronic key, and FIG. 4(*b*) is an explanatory view showing an example of an input screen by means of an electronic key or a 'start trial' button.

FIG. 8(a) is an explanatory view showing an example of an input screen for a function release electronic key, FIG. 8(b) is an explanatory view showing an example of a trial mode termination screen, and FIG. 8(c) is an explanatory view showing an example of an electronic key unlock screen.

FIG. 9 is a flow chart showing the flow of processes when an electronic key is inputted through an operation panel.

DETAILED DESCRIPTION OF THE PREFERRED EMBODIMENTS

The following will describe one embodiment of the present invention with reference to FIGS. 1 through 12.

Figure 1:
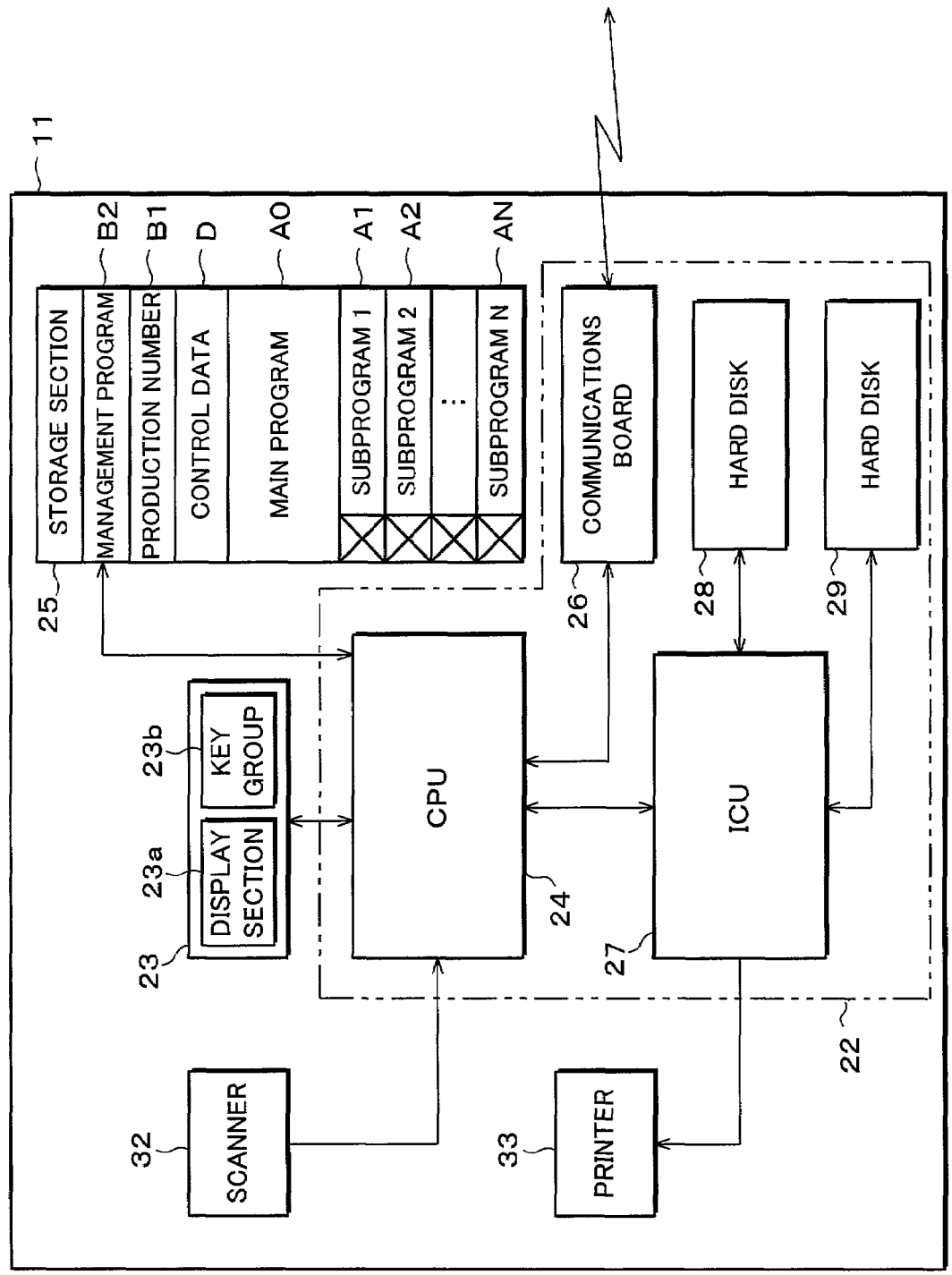
FIG. 1 is a block diagram showing an example of an arrangement of an image processing device provided with a trial management system according to the present invention.

As shown in FIG. 1, a trial management system according to the present invention is made up of, for example, a CPU (specifying section) 24 and a storage section 25 provided in an image processing device 11.

An arrangement of the image processing device 11 will be explained. Schematically, the image processing device 11 is equipped with an operation panel (trial instruction giving section) 23 having a key group 23b for accepting an input instruction from a user and a display panel 23a for displaying guidance to various types of information, such as processing status, with respect to the user. Further, the image processing device 11 includes a control section 22 which controls all the operation in the image processing device 11.

The CPU (Central Processing Unit) 24 is connected with not only the operation panel 23 but also the storage section 25 storing information such as various data and programs, a communications board 26, an ICU (Image Control Unit) 27, a scanner 32, and the like. Further, the ICU 27 is connected with hard disks (HD) 28 and 29 which are storage devices capable of managing data of a relatively large volume, a printer 33 for printing out image information, and the like. The control section 22 is made up of the CPU 24, the ICU 27, the communications board 26, the hard disk 28 and the hard disk 29.

The CPU 24 controls respective sections in accordance with an instruction inputted by a user via the operation panel 23 so as to cause the respective sections to carry out image processing and/or communication. For example, the CPU 24 controls the scanner 32 to scan a desired original image so that the original image thus scanned is, as image information, temporarily stored per page in a part of the storage section 25 or the hard disk 28 or 29, etc. Then, under the control of the CPU 24, the temporarily stored image information per page may be printed out by the printer 33 or transmitted via the communications board 26 to an external device which is designated as a transmission destination. The CPU 24 can also operate communications over a communications network such as the Internet or Internet, by controlling the communications board 26 in accordance with an instruction of the user.

The ICU 27 is an image processing unit, which performs predetermined image processing, such as tone correction, scaling, density conversion and the like, with respect to image information inputted from the scanner 32, handling the image information as one original image. Thereafter, the image information subject to various image processes is transferred to the printer 33 and processed so as to be reproduced as an image. The communications board 26 is a communications interface which is used to communicate with an external device as a digital combined machine.

The storage section 25 includes a storage region D storing various data related to the overall control of the image processing device 11, storage regions A0, A1 to AN storing various control programs, a storage region B2 storing a management program for managing a control program readout, and the like. Note that, information such as various data may alternatively be stored in the hard disks 28 and 29.

Figure 2:
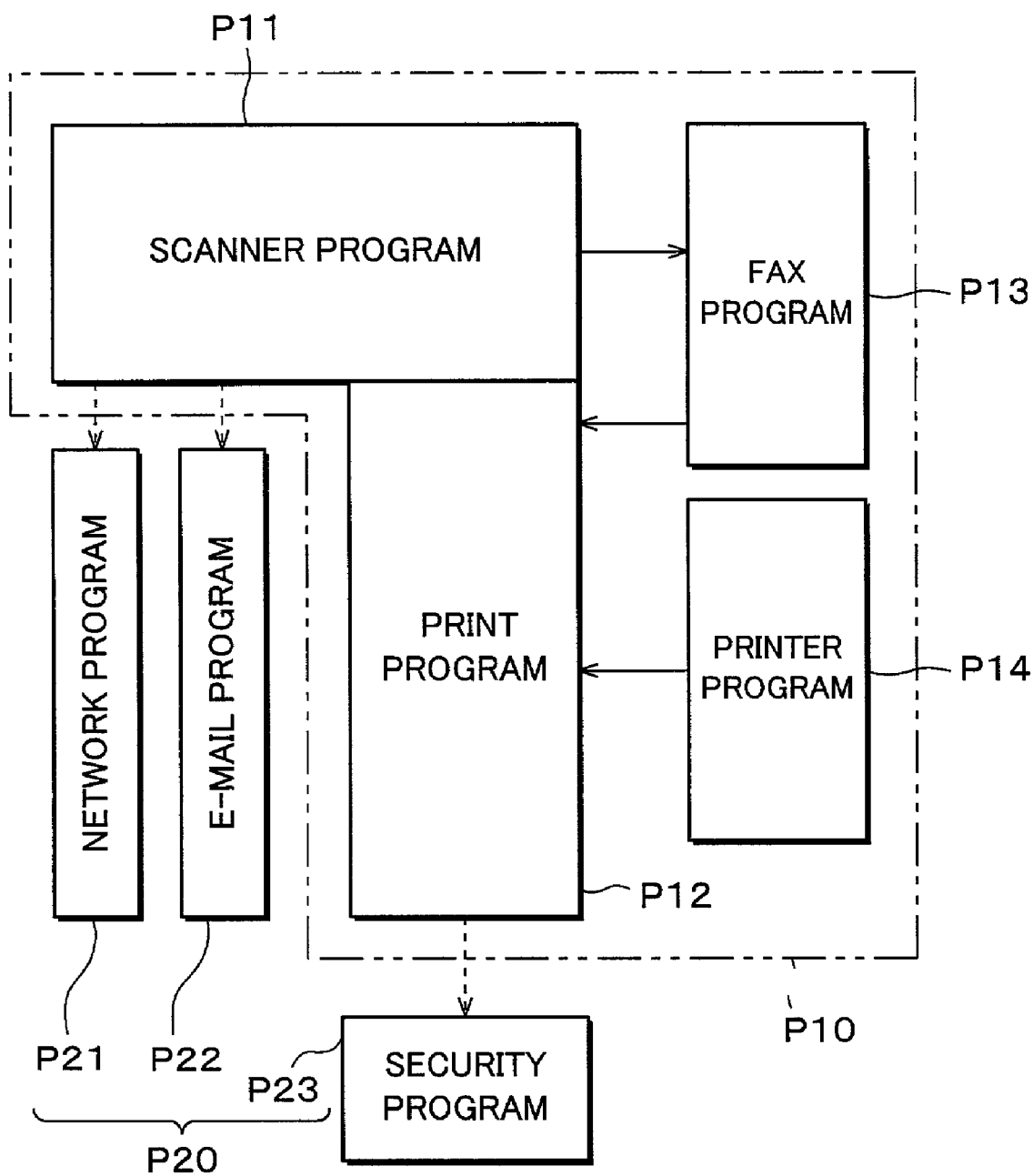
FIG. 2 is an explanatory view showing an example of an arrangement of control programs.

FIG. 2 is an explanatory view showing an arrangement of the control program. The control program is classified into a main program P10 which is a first program for performing basic operation and a subprogram (function program) P20 which is a second program for performing additional operation. The subprogram P20 made up of subroutines is accessible from the main program P10, and the subprogram P20 and the main program P10 make up one program.

The main program P10 is of the copy machine, printer and a facsimile device. More specifically, the main program P10 is made up of a scanner program P11 to be used when operating the copy machine and sending a facsimile, a print program P12 to be used when operating the copy machine, receiving a facsimile and operating a printer, a fax program P13 to be used when sending/receiving a facsimile, and a printer program P14 to be used when operating the printer.

The subprogram P20 is classified into two types: a subprogram (P21, P22) and a subprogram (P23). The subprogram (P21, P22) performs additional operation in cooperation in part with the main program P10, and the subprogram (P23) performs additional operation upon access from the main program P10.

Examples of the subprogram performing additional operation in cooperation in part with the main program P10 include a network program P21 which, in cooperation with the scanner program P11, sends image data in a state of file information scanned by the scanner 32 to a specific transmission destination via a transmission network, thereby allowing the image processing device 11 to be a scanner shared by a plurality of personal computers. The like example is an e-mail program P22 which sends the scanned image data in a state of a file attached to an e-mail.

On the other hand, examples of the subprogram performing additional operation upon access from the main program P10 include a security program P23 which, when accessed from the print program P12, erases image information in the hard disks 28 and 29 at predetermined timing, which image information was handled for a printing process by the image processing device 11 as the digital combined machine.

The network program P21 and the e-mail program P22 as described are not needed by a user whose image processing device 11 is not arranged to be accessible to a network of personal computers. Therefore, in general (at the time of shipment), the image processing device 11 is arranged so that when the CPU 24 refers to the management program, the main program P10 is read out, and the subprogram P20 is kept off the access. Further, the subprogram P20 is a program such as a network connection sequence or the like. The storage regions A1 to AN in the storage section 25 which are reserved for the subprogram P20 occupy space which is much smaller than space for the data storage section D or a storage section A0 for the main program P10. Therefore, the subprogram P20 does not incur substantial cost increase when manufacturing the storage section 25 such as a memory or the like.

The following will describe one embodiment of functional upgrading operation which enables access to the subprogram P20 in the image processing device 11 and trial management system arranged as described. Note that, the system will be explained using the digital combined machine as an example, but the system is also applicable to an electronic device which operates in accordance with a predetermined control program, such as an electronic medical device.

Here, information on system facilities which can be upgraded in terms of performance and function by activating the subprogram P20 is previously provided to a user via an instruction manual for the image processing device 11, an operation guidance screen displayed in the display section of the operation panel 23, or a sales brochure, etc., thereby allowing the user to learn about the details of the facilities.

When the user, who learned about the foregoing guidance information, desires any of the functions, he/she can request purchase or start of a trial of, the subprogram P20 corresponding to the desired function by simply advising a service center, etc., of the request for upgrading. In response to this request, the service center, etc., issues a predetermined electronic key which is selected according to either a device configuration of the image processing device 11 used by the user who made the request, or the user's device use patterns (e.g. the number of users). The electronic key thus issued allows the user to release a given program from access-protect (i.e., start the authorized use of the program) or start a trial use of the program. Alternatively, the user may start a trial of all the subprograms available in the device configuration, which will be described later.

Here, the electronic key is a code to release a subprogram subject to access-protect into an accessible state. The code employed here is a combination of numerals inputted via a numeric keypad. The electronic key includes an authorized key to be issued when the user formally purchases the subprogram (hereinafter referred to as "authorized key"), a trial key for starting a trial for a predetermined period, and a specified key for giving an instruction to, for example, change a trial period (hereinafter referred to as "specified key"). Each electronic key has a numerical value unique to the corresponding image processing device 11. The value is previously determined by the management program.

Further, hereafter, the "trial key" refers to a key which is inputted to give an instruction to start a trial. The trial key is classified into two types: a trial key in a state of the electronic key, and a trial key in a state of a touch-panel button ('start trial' button) which is displayed in the display section of the operation panel 23 or the like.

Figure 3:
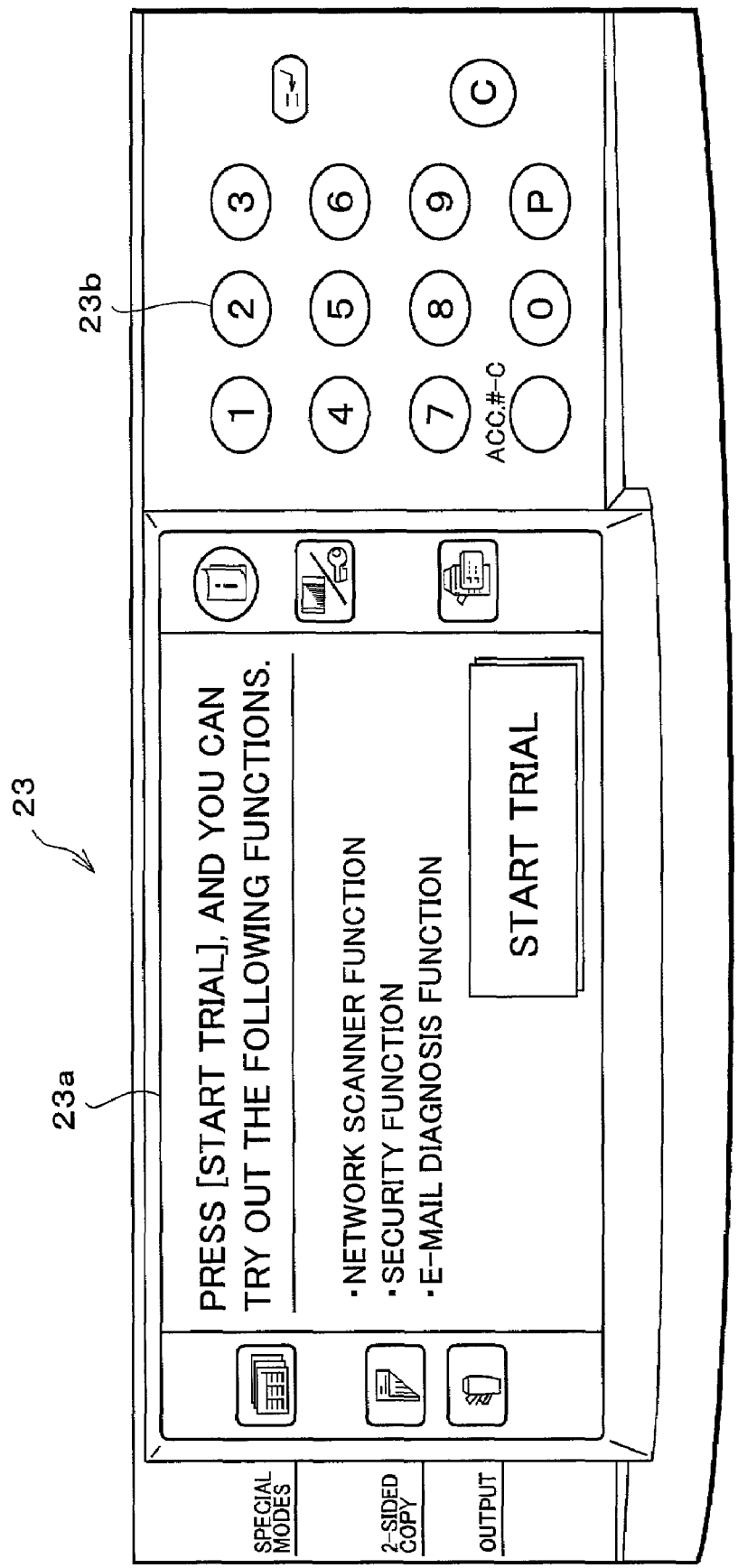
FIG. 3 is an explanatory view showing an example of a 'start trial' screen.

The following will describe user's operation for starting a trial with reference to FIGS. 3 to 8(*c*). FIG. 3 shows a state of the operation panel 23 in the case where, for example, the original mode of the operation panel 23 shifts to a mode to give an instruction to start the trial.

Here, the operation panel 23 displays a list of functions which may be added by activating the subprogram P20 stored in the storage section 25. Touching a 'start trial' button displayed in that state of the operation panel 23 changes a screen to a system check screen shown in FIG. 5. The system check screen allows a user to confirm additional functions available in the currently used system. In FIG. 3, the trial key is inputted by means of the 'start trial' button alone. Other possible trial key input screens are an input screen capable of input by means of the electronic key alone (FIG. 4(*a*)), and an input screen capable of selection between the input by the electronic key and the input by the 'start trial' button (the button with a legend 'START TRIAL' shown in FIG. 4(*b*)). In the respective input screens of FIGS. 4(*a*) and 4(*b*), equally, the user can proceed to the authorized use of a function program by the input of an electronic key which releases the function program from access-protect (function release). Moreover, in the same input screens for the electronic key to proceed to the authorized use, other specific keys to specify a trial period (i.e., start, termination or extension of a trial mode [trial state]) may be inputted as well.

Here, in the case where the trial key in the state of the 'start trial' button is inputted, as discussed below, the device configuration of the present image processing device 11 is recognized by the CPU 24. Then, based on the result of the recognition is made a judgment of whether or not each subprogram P20 is operational in the present image processing device 11. Based on the result of the judgment in turn, the management program permits access to those operational in the present image processing device 11 among the subprograms P20 stored in the storage section 25, thereby starting a trial of the operational functions. The maximum period and the maximum number of use of the trial are separately predetermined for each program by the management program, and the trial mode continues up to a predetermined limit accordingly.

Meanwhile, numerous variations (patterns) of a combination of numerals exist as the trial key in the state of an electronic key. The management program relates each pattern to a program to start the trial. Furthermore, the management program also relates the maximum period and the maximum number of use of the trial to each pattern. Accordingly, when a predetermined pattern of the numeral combination is inputted, a program corresponding to the inputted pattern becomes available in the trial within the predetermined period (the predetermined number of use).

Figure 5:
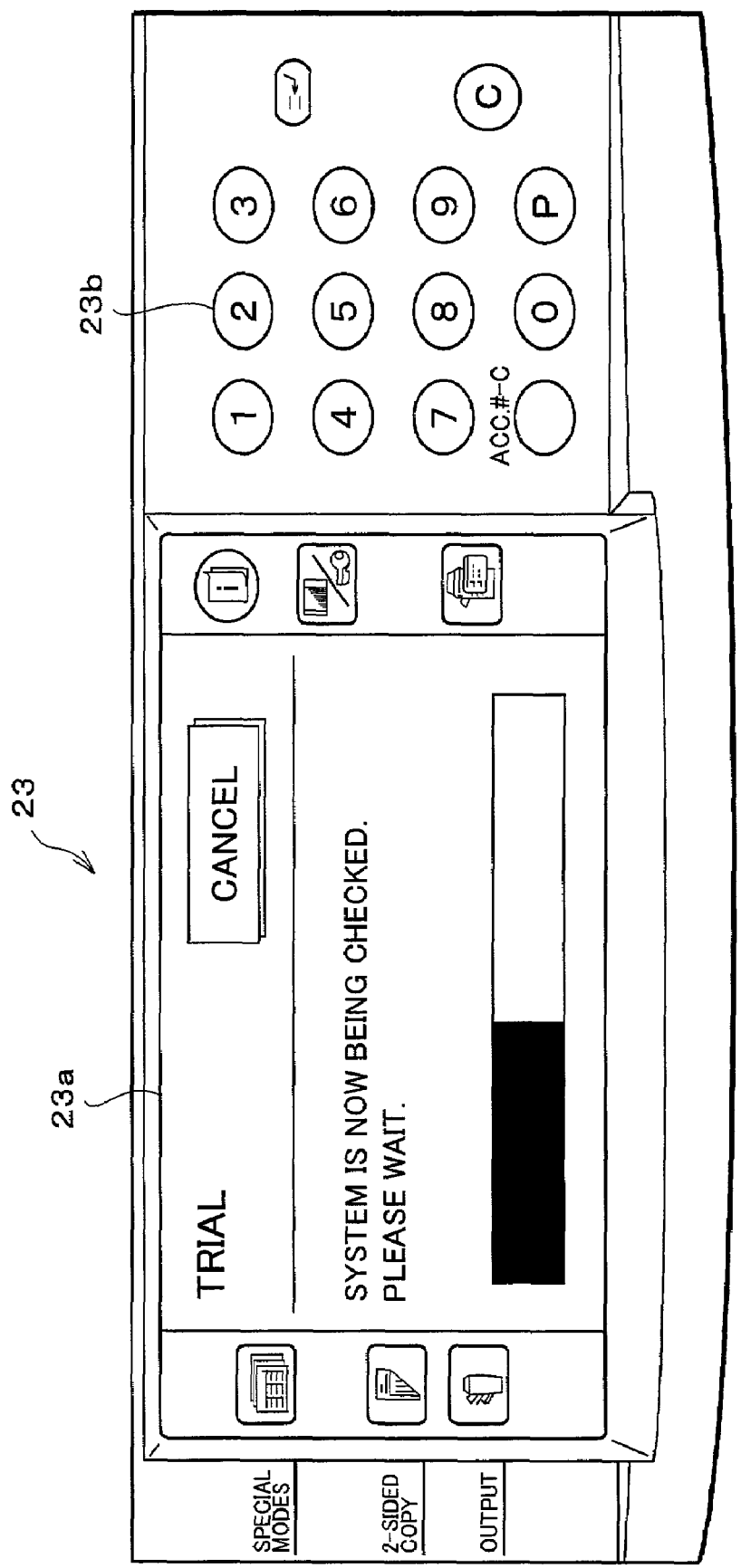
FIG. 5 is an explanatory view showing an example of a trial key authentication screen.
Figure 6:
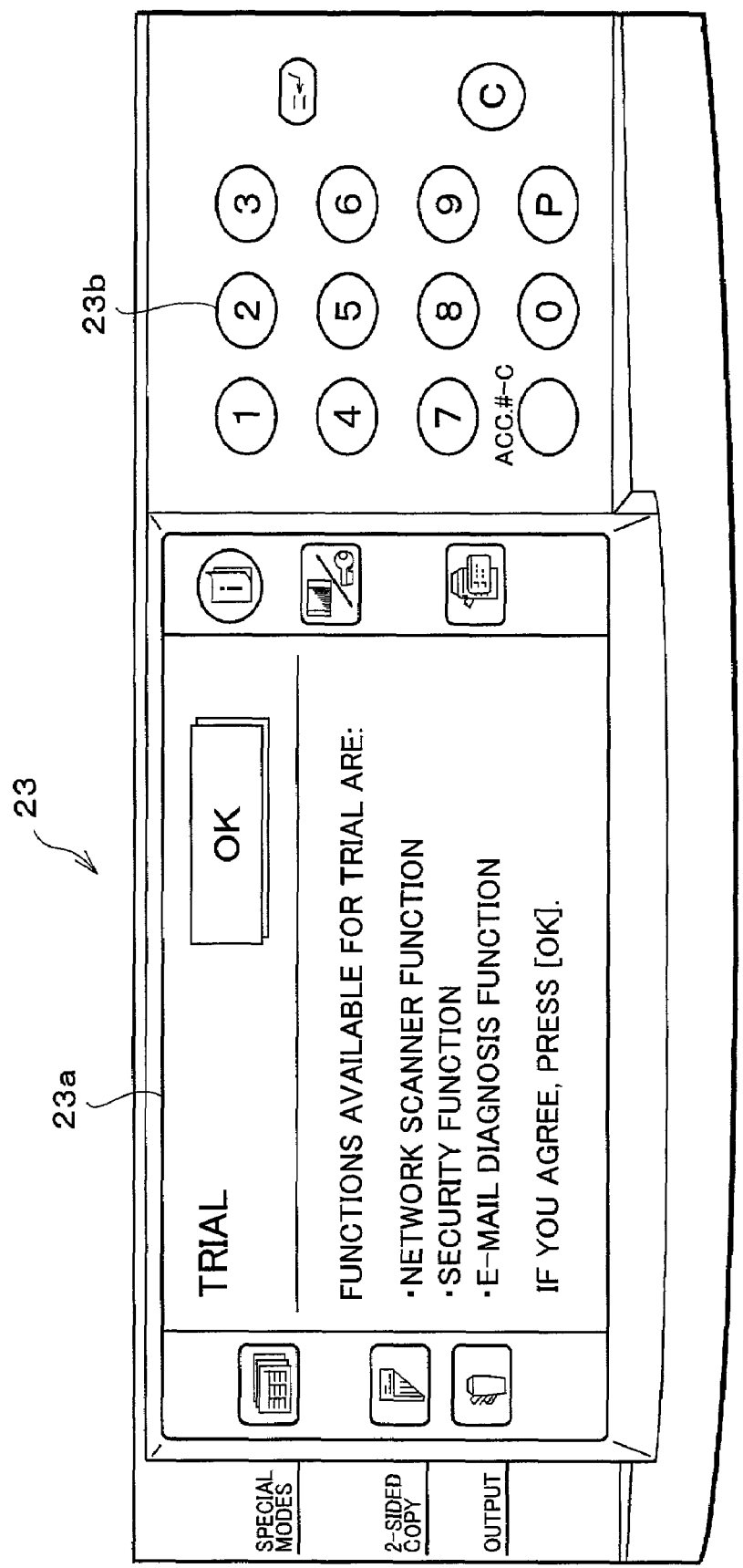
FIG. 6 is an explanatory view showing an example of a trial mode confirmation screen.
Figure 7:
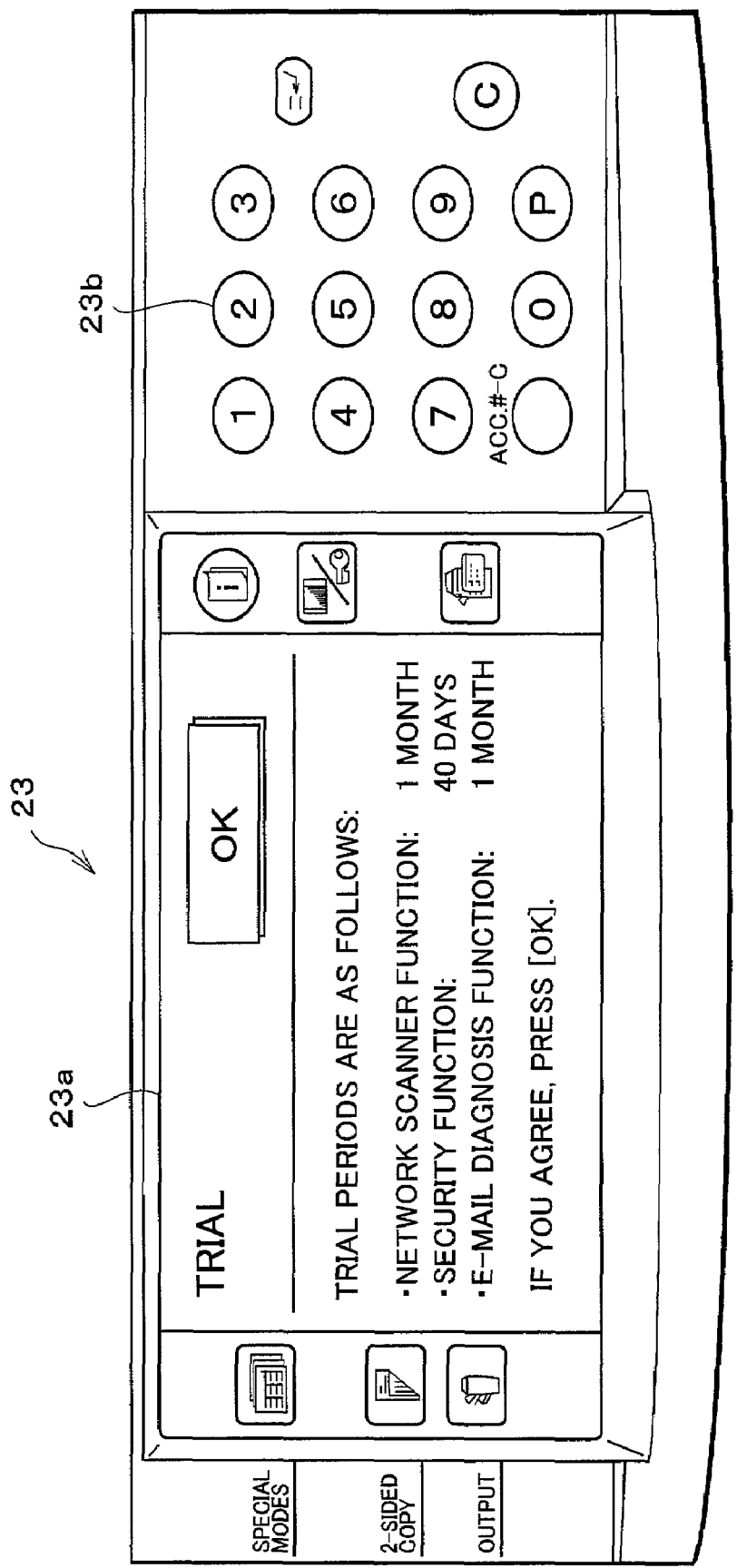
FIG. 7 is an explanatory view showing an example of a trial period confirmation screen.

When either of the trial keys is inputted, display turns to the one shown in FIG. 5. Here, recognition of the device configuration of the image processing device 11 by the CPU 24 is in progress. The recognition of the device configuration allows the CPU 24 to pick up the functions which are actually available for use in the device configuration of the image processing device 11. The functions thus selected by the CPU 24 are listed up on display as shown in FIG. 6, where the functions corresponding to all the subprograms P20 are actually available for trial. Alternatively, display as shown in FIG. 7 may be adopted. In the display of FIG. 7 are shown the trial periods of the respective functions in addition to the functions available for trial. The period is set by the management program. Further, in the case of inputting the electronic key as the trial key, the period may be arranged to vary in accordance with the type of an electronic key inputted. Note that, the trial may be given a limitation not only by the period but also by the number of use.

Upon touch of an 'OK' button by the user who confirmed the display, the trial starts.

Figure 8A:
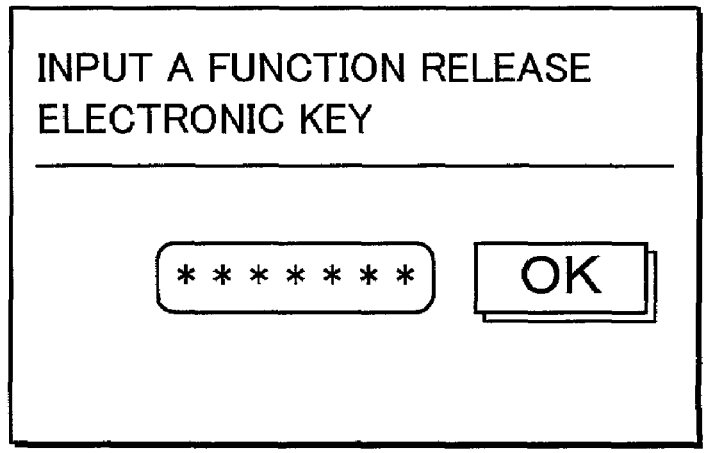
FIGS. 8(a) through 8(c) show a case where an electronic key is inputted during a trial period.
Figure 8B:
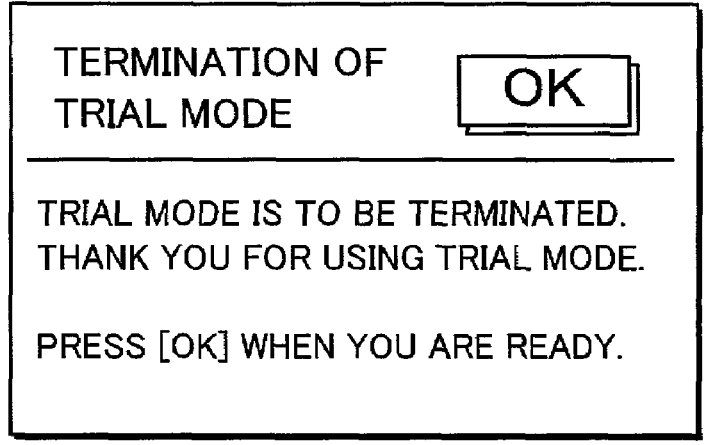
Figure 8C:
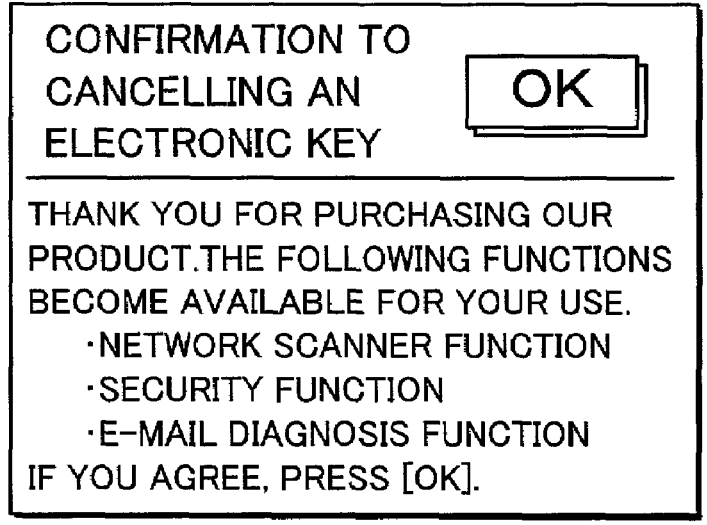

Note that, trial conditions may be changed by further inputting an electronic key as the specified key within the trial period. For example, as shown in FIGS. 8(*a*) through 8(*c*), in a screen prompting input of a function release electronic key (FIG. 8(*a*)), inputting a specified key (e.g. "10000000") can terminate the trial (FIG. 8(*b*)). Another specified key can extend the trial period. Further, the trial mode can be shifted to the authorized use mode (FIG. 8(*c*)) as follows: a user obtains an authorized key from a service center, etc., by taking a step to purchase a subprogram, thereafter inputting the authorized electronic key thus obtained to a screen (FIG. 8(a)) which prompts input of the function release electronic key. The key-to-function ("function" here includes termination, extension, etc., of the trial period) relationships for each specified key and the authorized key, respectively, are set by the management program. Note that, an authorized key to be inputted during the trial period may be regarded as a sort of specified key.

Next, the following will describe the flow of processes in the present trial management system with reference to flow charts of FIGS. 9 to 12. Note that, the processes described below are to be performed by the foregoing management program.

Figure 10:
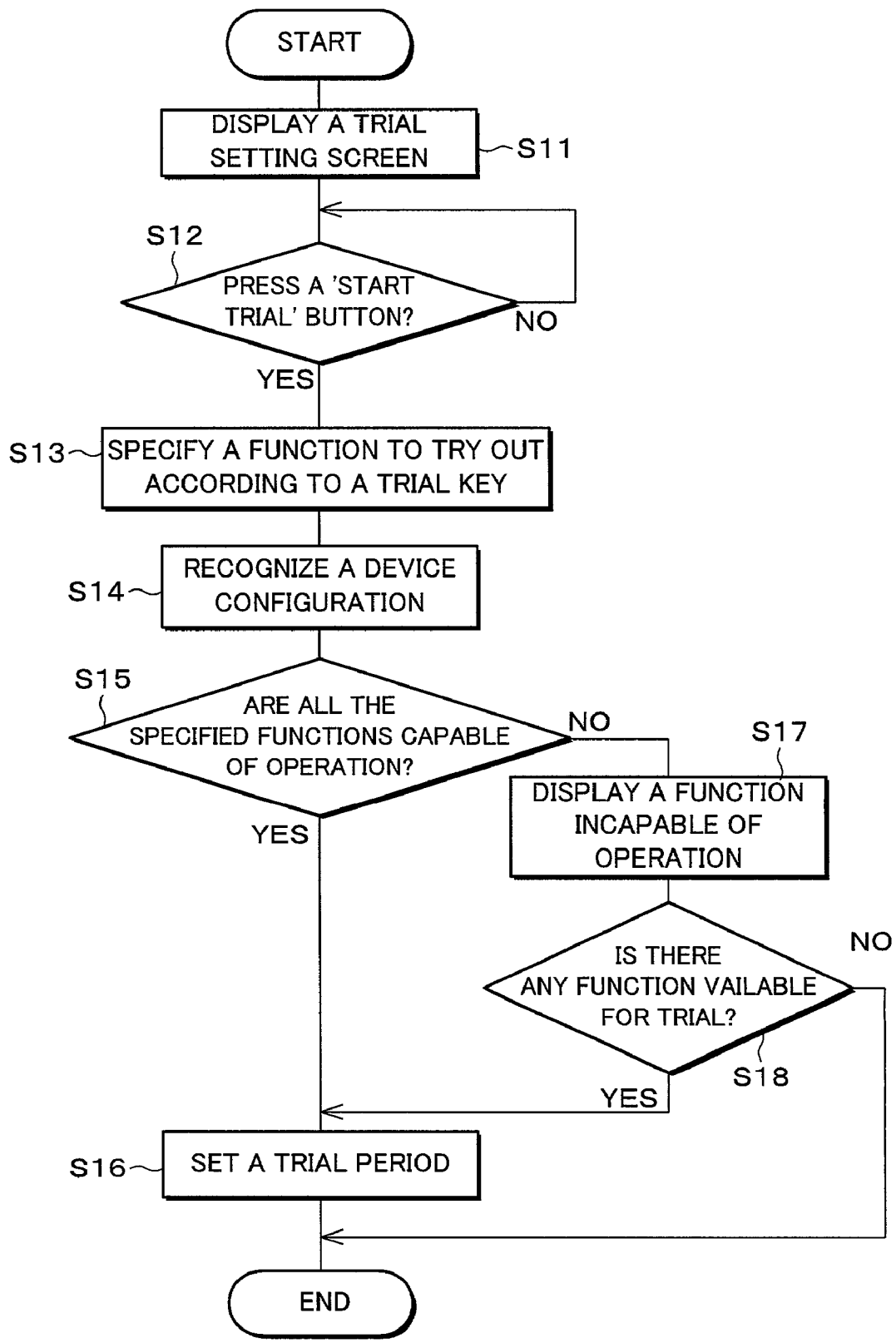
FIG. 10 is a flow chart showing the flow of start trial processes.
Figure 11:
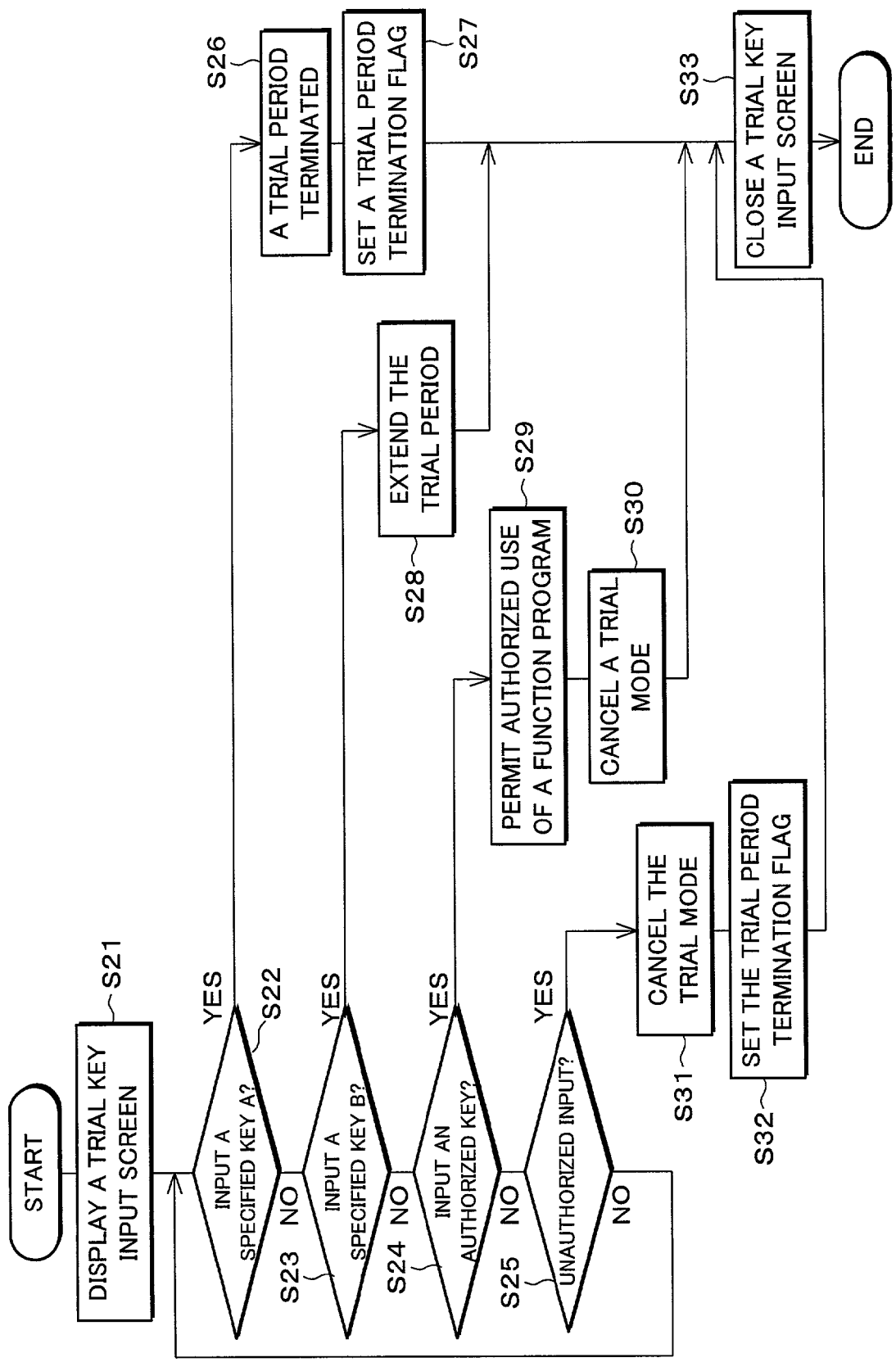
FIG. 11 is a flow chart showing the flow of processes when a trial period is changed during the trial period.

FIG. 9 is a flow chart showing the flow of processes in the case where an electronic key is inputted via the operation panel 23. When the electronic key is inputted (step S1), the type of the electronic key is discriminated by checking it against different keys one after another, that is, if it is an 'authorized key' issued upon purchase of the subprogram P20 as being a commercial product or a 'trial key' or a 'specified key' which should be inputted during a trial period (steps S2 to S4). Here, when the electronic key is the authorized key, the subprogram corresponding to the authorized key is released from access-protect (step S5). In the case of the trial key, in order to start the trial corresponding to the trial key, the processes of S13 onward shown in FIG. 10 are performed (step S6). In the case of the specified key, a judgment of whether or not it is within a trial period is made (step S7), then, in order to change the trial period, the processes shown in FIG. 11 are performed (step S8). Upon completion of steps S5, S6 and S8, or when the judgment made in step S7 shows that it is not within the trial period, an input screen for the electronic key is closed (step S9), thereby terminating a series of processes.

FIG. 10 is a flow chart showing the flow of the process for starting a trial. The trial starts when (i) an electronic key as the trial key is inputted as described, or (ii) a 'start trial' button as the trial key is touched. In the former case (i), the process shifts from step S3 of FIG. 9 to S13 of FIG. 10. In the latter case (ii), a trial setting screen (FIG. 4(b)) is displayed (step S1) so as to await the user to touch the trial start button (step S12).

When the user inputs the electronic key or 'start trial' button as the trial key, the CPU 24 then specifies a function (program) which is the target of trial according to the inputted trial key (step S13) Here, in the case where the electronic key is inputted as the trial key, the function associated with the inputted electronic key is specified. On the other hand, when the 'start trial' button is inputted as the trial key, the overall subprograms P20 are specified.

Next, the device configuration of an image processing device 11 is recognized (step S14). Thereafter, a judgment of whether or not the functions specified in step S13 are operational is made based on the recognition resulted from step S14 (step S15). In the case where the judgment shows that all the functions specified in step S13 are operational, a period capable of trial is set by the management program. In the case where the electronic key was inputted as the trial key, a period capable of trial is set according to the inputted electronic key as with the foregoing case (step S16). However, in the case where some of the functions specified in step S15 are non-operational, those incapable of operation are displayed (step S17). This is followed by a judgment of whether or not there are other operational functions specified (step S18). In the presence of such operational functions, the process of step S16 is performed with respect to the operational functions, and in the absence, the sequence goes to the end. The possible reasons for incapability of a function may be (i) the complete absence of the provision of a device component which is essential to using that function, (ii) the temporary absence of the essential device component, (iii) a failure in the device component, and the like.

FIG. 11 is a flow chart showing the process for changing a trial period during the trial period. When an electronic key is inputted during the display of the input screen for the electronic key as the trial key (step S21), discrimination in type of the inputted electronic key is made in steps S22 to S25. The inputted electronic key can roughly be classified into three groups: the specified key, the authorized key, and an unauthorized key other than the previous two key groups. In addition, the specified key includes, for example, a key indicative of the termination of a trial period ("specified key A", hereinafter), a key indicative of the extension of the trial period ("specified key B", hereinafter), and others.

Upon input of the specified key A, the trial period terminates (step S26), thereafter setting a flag (trial period termination flag) indicative of the termination of the trial period (step S27). When the specified key B is inputted, the trial period is extended by adding a predetermined period according to the inputted key (step S28).

When the authorized key is inputted, a function to be shifted from trial to authorized use is released from access-protect (step S29), thereby terminating the trial mode (step S30).

In the case where an electronic key which is not set by the management program is inputted, it is likely that a user attempts to release a function from access-protect by an unauthorized method. Therefore, when it is judged that the attempt as such was made a predetermined number of times, the trial mode is canceled (step S31). Moreover, the flag (trial period termination flag) indicative of the termination of the trial period is set (step S32), thereby protecting the function from an unauthorized use.

When the processes are completed, the input screen for the trial key is closed, thereby terminating a series of process.

Figure 12:
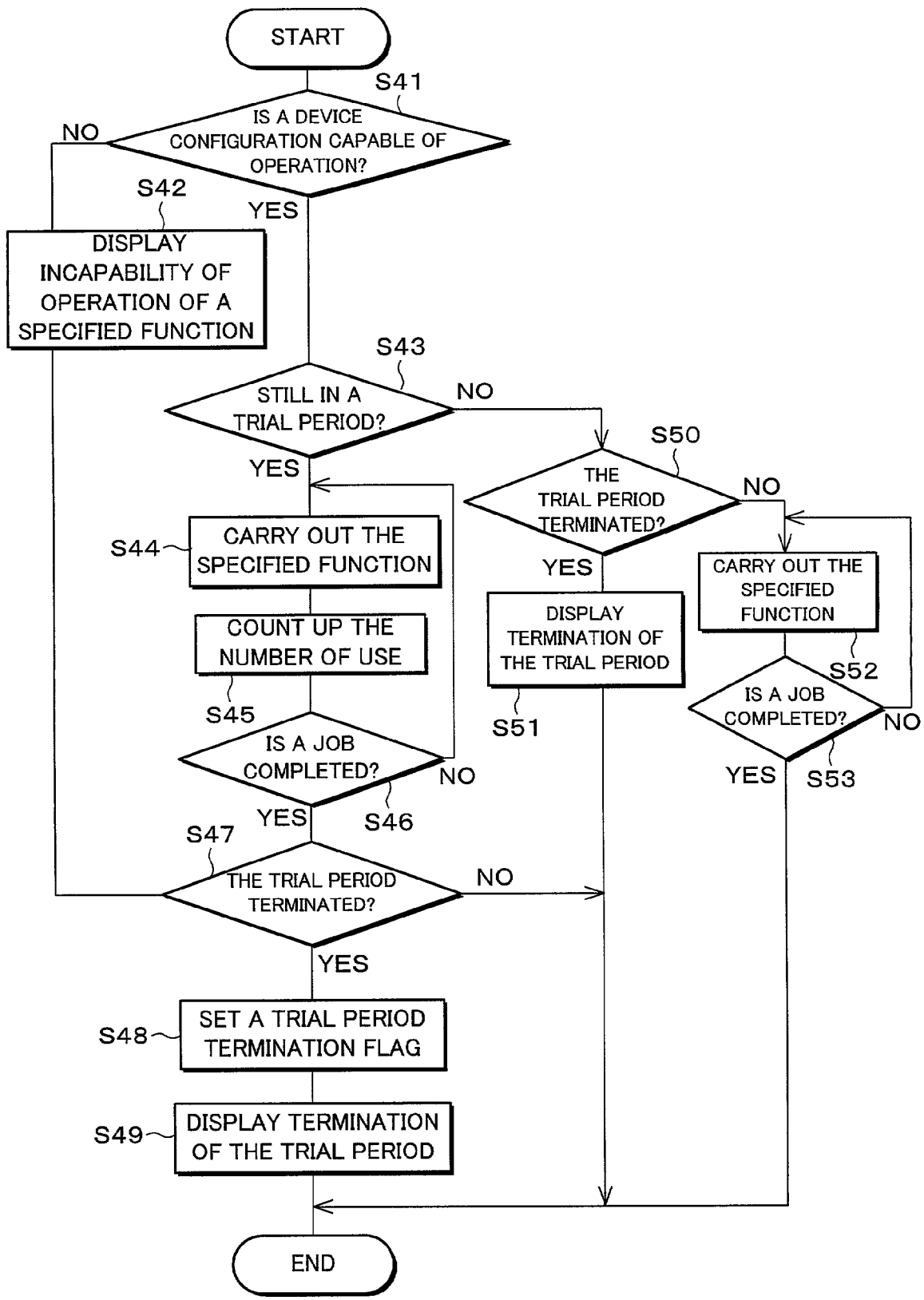
FIG. 12 is a flow chart showing the flow of processes when a function based on a subprogram is performed.

FIG. 12 is a flow chart showing the flow of the process in the case where a function of the subprogram P20 is used. When a user performs instruction-giving operation to use a trial mode of the target function corresponding to either one of the subprograms P20, the control section 22 first checks as to whether or not the device configuration of an image processing device 11 is capable of operating the target function as part of a system (step S41). Here, as discussed, the possible reasons for incapability of the function may be (i) the complete absence of the provision of a device component which is essential to using that function, (ii) the temporary absence of the essential device component, (iii) a failure in the device component, and the like. If any of these is the case, the reason is displayed (step S42), and the flag (trial period termination flag) indicative of the termination of the trial period is set (step S48). Besides, a message indicative of the termination of the trial period is displayed (step S49), thereby terminating the process. This prevents setting of the trial mode with respect to a function which cannot be used in view of the device configuration. Note that, when the function becomes operational after the provision of the essential device component or repair of a failure portion, then the trial period termination flag is reset by a serviceperson, etc., to its normal state allowing the trial to be performed again.

In step S41, if the target function is operational as part of the system, then the control section 22 checks whether it is within a trial period at that time by, for example, making a comparison between a predetermined period capable of trial and the date that a built-in clock of the image processing device 11 shows at that time, examining whether or not the number of use of trial reached a predetermined number of times, or the like method. As a result of the check, the control section judges whether or not the target function is operational in the trial mode (step S43). If the target function is operational in the trial mode, the target function is activated (step S44), while counting the number of use (copy counts, etc.) (step S45). Note that, the number of use here can be used as client data indicating how often the user uses the trial mode, which data later aids in provision, etc., of services. Further, a judgment of whether or not a series of jobs (processes) are completed is made (step S46), and if not, the sequence goes back to step S44, and the process thereafter is repeated. When a series of jobs are completed, as in step S43, a judgment is made to see if the trial period expired (step S47). In the case where the trial period has not yet expired, the process is terminated at that point. However, in the case where the trial period has already expired, the flag (trial period termination flag) indicative of the termination of the trial period is set (step S48), then, a message indicative of the expiration of the trial period is displayed (step S49), thereby terminating the process. The trial period termination flag indicates whether or not the trial of the same function was already performed in the past.

Note that, thus judging the expiration of the trial period after completion of jobs prevents a problem which may occur as follows: when, for example, a large amount of jobs were started when the trial period almost expired, the target function becomes unusable during execution of the jobs. Incidentally, an alternative arrangement may be adopted in the case where a series of jobs are executed under the condition that the expiration of the trial period is confirmed first, before confirming the completion of the jobs. With this arrangement, when the expiration of the trial period is confirmed during the execution of the jobs, the trial period does not expire in reality until the jobs are completed.

In step S43, in the case where it is not within the trial period at the time such a judgment is made, then a judgment of the expiration of the trial period is made with reference to the trial period termination flag; in other words, a judgment is made as to whether the trial of the same function was already performed in the past (step S50). When the trial period has already expired, i.e., when there is a fact that the trial of the same function was already performed in the past, a message on display advises the user of that fact (step S51), thereafter terminating the process. This is to forbid the trial of the same function to be performed more than once in the case where the trial of the same function was already performed in the past, in the arrangement in which the judgment in step S43 reveals that it is not within the trial period at the time the judgment is made, the program shifts to the trial mode (i.e., enters the trial period), then, the target function starts performing its process in the trial mode. In this manner, the trial of the same function is prevented from being repeatedly performed.

On the other hand, in the case where the trial period has not yet expired in step S50, i.e., in the case where a trial of the target function has never been performed before, the program shifts to the trial mode, thereby performing the first trial of the target function (step S52). When the job of the function is completed (step S53), the process is terminated.

In addition to the foregoing arrangement, a trial management system of the present invention may have an arrangement in which the foregoing trial instruction giving section receives input of the trial key associated with each function, as a user's instruction.

With this arrangement, when the trial key for giving an instruction to perform trial operation of the function is inputted, the corresponding function is controlled.

Consequently, only the function program corresponding to the inputted trial key is made available for trial, thereby enabling a user to try out the desired function with simpler operation, which is an additional effect to that of the foregoing arrangement.

Further, in addition to the foregoing arrangement, a trial management system of the present invention may have an arrangement in which the control section judges whether or not the function which is the target of the instruction received by the trial instruction giving section is operational, thereafter setting only the operational functions to be available in the trial mode.

With this arrangement, when the trial instruction giving section receives an instruction from the user, then the control section judges whether or not the function targeted in the instruction is operational. Based on the result of the judgment the control section sets only the operational functions to be available in the trial mode that allows the user to try out the function.

Consequently, it is possible to prevent a problem such that functions which are non-operational are mistakenly set to be available in the trial mode, and a trial period expires while leaving such functions unusable, thereby surely providing only the operational functions in the trial mode, which is an additional effect to that of the foregoing arrangement.

Further, in addition to the foregoing arrangement, a trial management system of the present invention may have an arrangement in which the trial key includes data of the function itself and trial-use limitations imposed thereon, and when the trial key is inputted to the trial instruction giving section the control section sets a trial period of the target function specified by the trial key received by the trial instruction giving section according to the trial-use limitations indicated by the trial key received by the trial instruction giving section.

With this arrangement, when the trial key including the data of a function itself and the trial-use limitations imposed thereon is inputted, a trial period for the function is set according to the trial-use limitations indicated by the trial key.

Consequently, a manufacturer only needs to stock trial keys respectively corresponding to different limits, so that a limit which is suitable to each user's use conditions can be set. For example, when a user's request for trial is received, and when the trial is performed using such devices that are accessed by a large number of users or frequently used, then trial-use limitations can be loosened at setting, for example, in terms of the length of a trial period, the number of use and the like (i.e., a large extension of the period, an increase in the number of use, etc.). Accordingly, trial-use limitations suitable to each user can be set without increasing a burden to the manufacturer, thus improving services.

Further, in addition to the foregoing arrangement, a trial management system of the present invention may have an arrangement in which the control section changes a trial period of the function.

With this arrangement, it is possible to change a trial period of a function. For example, during a trial period of a function, the trial period can be changed.

Thus having a means to change a trial period of a function according to a use environment or circumstances of a system makes it possible to solve such a problem that a job of the function is interrupted during its operation or that a trial period expires and a function cannot be operated accordingly though a user almost decided to adopt the function. As a result, a user is allowed to have a sufficient length of time as a trial period before the user finally decides whether to purchase the function formally, which is an additional effect to that of the foregoing arrangement.

Further, a trial management system according to the present invention may have an arrangement in which, in addition to the foregoing arrangement, when the control section detects expiration of the trial period for a function during execution of a job thereof, the trial period for the function being set according to the instruction received by the trial instruction giving section, then the control section postpones the expiration of the trial period for the function until time the job of the function is actually completed.

With this arrangement, in the case where a trial period for a function expires during execution of a job of the function, the expiration of the trial period for the function is postponed until the time when the job of the function is completed. In other words, the trial of a function is not terminated during execution of a job of the function that is a target of trial, and the trial of the function is terminated after completion of the job of the function.

Accordingly, when a predetermined function is tried out, it is possible to prevent a job of the function from being interrupted during execution, thereby enabling a user to more conveniently use a trial mode. In this manner, the user can use the trial mode more conveniently, which is an additional effect to that of the foregoing arrangement.

Further, a trial management system of the present invention may have an arrangement in which, in addition to the foregoing arrangement, the trial instruction giving section receives the user's instruction in the form of a specified key associated with a trial period for each function, and the control section sets the trial period for the function according to data of the trial period indicated by the specified key received by the trial instruction giving section.

With this arrangement, when the specified key indicating the trial period for the function is inputted, the trial period for the function is set according to the inputted data of the trial period.

Therefore, during the trial period associated with the inputted specified key, only the function associated with the inputted specified key becomes available for trial, thereby enabling a user to try out a desired function at the most desirable time for the user with easier operation, which is an additional effect to that of the foregoing arrangement.

Further, a trial management system of the present invention may have an arrangement in which, in addition to the foregoing arrangement, the control section judges whether or not the specified key received by the trial instruction giving section indicates data which extends a trial period, and extends the trial period for the function specified by the trial instruction giving section when the specified key indicates the data which extends the trial period.

With this arrangement, when a specified key for giving an instruction to extend a trial period is inputted as desired by a user, the trial period is extended in accordance with the instruction.

Therefore, it is possible to flexibly set appropriate duration of an extension according to the use status of the function during the trial period. For example, in the case where the function is used more than it was expected during a trial period, and therefore sales of consumables which are essential in executing a job of the function are forecast to be high, a manufacturer, in response to a user's request, advises a user of a specified key for extending the trial period, for example, only for a predetermined duration of time. The user then inputs the specified key, thereby fully executing a job of the function in the trial period after extension. This allows a trial period to easily reflect the manufacturer's and/or the user's wants, which is an additional effect to that of the foregoing arrangement.

Further, a trial management system of the present invention may have an arrangement in which, in addition to the foregoing arrangement, the control section judges whether or not the specified key received by the trial instruction giving section indicates correct data, and when an incorrect specified key is inputted a predetermined number of times, the control section terminates the trial period for the function specified by the trial instruction giving section.

With this arrangement, in the case where an unauthorized specified key is inputted, control is made to prevent trial of the target function. This can draw a user's attention to a potential unauthorized act by suspending use of the function, which is an additional effect to that of the foregoing arrangement.

Further, a trial management system of the present invention may have an arrangement in which, in addition to the foregoing arrangement, the control section judges whether or not the specified key is an authorized key which gives an instruction to terminate the trial period so as to proceed to a state of authorized use, and when the specified key received by the trial instruction giving section is the authorized key, the control section terminates the trial period for the function specified by the trial instruction giving section and proceeds to the state of authorized use.

With this arrangement, when an authorized key is inputted, a trial period for the specified function is terminated, thereby proceeding to a state of authorized use.

Therefore, even when in a trial period, simply inputting specific data enables a user to formally purchase a license to use the target function and thereby continue using the function as before. Thus, it is possible to proceed from trial use to authorized use more conveniently, which is an additional effect to that of the foregoing arrangement.

Further, a trial management system of the present invention may have an arrangement in which, in addition to the foregoing arrangement, the control section judges whether or not an environment which is essential to carrying out the function received by the trial instruction giving section is completely available, and when the environment essential to carrying out the function received by the trial instruction giving section is not completely available, the control section terminates the trial period for the function specified by the trial instruction giving section.

With this arrangement, when an environment essential to carrying out a function is not completely available, a trial period for the function specified by the trial instruction giving section is terminated. In the case where the environment essential to carrying out the function is not completely available, the reason may be that, for example, a system configuration unit (a post-processing unit for a post-processing function, a scanner unit for a scanner function, or the like) which is essential to trying out a function is not in an operational state (failure, detachment or the like).

As a result, it is possible to prevent a problem such that a trial period goes automatically, remaining in a non-operational state, so that a trial cannot be restarted. Moreover, a trial can be restarted after, for example, removal of a problem, such as a failure or the like, by a serviceperson dispatched from a manufacturer. Accordingly, thus restoring a trial operation environment to its correct state allows a user to secure a sufficient length of trial period, thereby correctly understanding the target function during the trial period more easily, which is an additional effect to that of the foregoing arrangement.

Note that, a trial management system according to the present invention, in which a plurality of function programs are previously stored, and a trial of each function program is available, may have an arrangement in which a trial key capable of controlling trial operation of each function program can be inputted, and the trial key is associated with a function program which is to be set to be available in a trial mode for a predetermined period upon input of the trial key.

Namely, only the function program associated with the inputted trial key is made available for trial.

With this arrangement, among the plurality of function programs, only the trial of the function program associated with the inputted trial key can be started. Consequently, a trial of the function program that meets a requirement of a user can be performed with simple operation, thereby enabling a user to try out a desired function at desired time.

A trial management system according to the present invention may have an arrangement in which, in the trial management system of the foregoing arrangement, when the trial key is inputted, a judgment of whether or not a function associated with each function program is operational is made for each function program, and only the operational function programs are set to be available in a trial mode.

Namely, before a trial is made available, a system is checked if it has an environment which can operate the target function.

A trial management system according to the present invention, in which one or a plurality of function programs are previously stored, and a trial of each function program is available, may have an arrangement in which a trial key capable of controlling trial operation of each function program can be inputted, and when the trial key is inputted, a judgment of whether or not a function associated with each function program is operational is made for each function program, and only the operational function programs are set to be available in a trial mode.

With this arrangement, upon input of the trial key, only those operational in a device among the plurality of function programs are set to be available in a trial mode. This prevents a problem that non-operational function programs are set in a trial mode, and a trial period expires while leaving the function programs unusable. Moreover, the functions are set to be available in the trial mode in an operational state, thereby allowing a user to correctly understand the functions in the trial mode.

A trial management system according to the present invention, in which a plurality of function programs are previously stored, and a trial of each function program is available, may have an arrangement in which a trial key capable of controlling trial operation of each function program can be inputted, and the trial key is associated with a function program which is to be set in a trial mode upon input of the trial key, and with a trial period or the number of use available for the function program.

Namely, the trial key is associated with information on a function program which enables a trial and a trial period.

With this arrangement, among the plurality of function programs, only those associated with the inputted trial key become operational. Further, a trial period can be set for each function program according to the trial key, thereby enabling a user to try out a desired function program during an appropriate period of time (for example, a period set according to the amount of use and/or the number of users) with simple operation, thus more flexibly setting a trial mode. Accordingly, a trial mode can be set according to an environment in which the function and device are used.

A trial management system according to the present invention, in which a plurality of function programs are previously stored, and a trial of each function program is available, may include period change means for changing a trial period for the function program during the trial period of the function program.

This arrangement includes the period change means for changing the previously set trial period for the function program according to a use environment or circumstances of a system. Therefore, it is possible to solve a problem such that the function program is interrupted during its operation or that a trial period expires and a function cannot be operated accordingly though a user almost decided to adopt the function.

A trial management system according to the present invention may have an arrangement in which, in the trial management system of the foregoing arrangement, when a period or the number of use available for trial reaches an end during execution of a job, the period change means terminates the trial after allowing the job during execution to be completed.

With this arrangement, in the case where a job is processed using a predetermined function for trial, it is possible to prevent the job from being interrupted during execution. This enables a user to more conveniently use a trial mode.

A trial management system according to the present invention may have an arrangement in which, in the trial management system of the foregoing arrangement, as the period change means, a specified key for changing the settings of a period or the number of use available for trial in a trial mode can be inputted during the trial mode.

With this arrangement, it is possible to change, during a trial period, the trial period and the number of use according to a use status, a change in a use environment, etc., of a function program. This enables a trial to be performed according to a change in an environment in which the function and device are sued, thus more flexibly setting a trial mode.

A trial management system according to the present invention may have an arrangement in which, in the trial management system of the foregoing arrangement, the specified key includes the one to extend a period or the number of use available for trial.

With this arrangement, in the case where the function is used more than it was expected in a trial mode, and therefore use (sales) of consumables, etc., is forecast to be high by a manufacturer, a trial period can be extended, thereby more flexibly setting the trial mode.

A trial management system according to the present invention may have an arrangement in which, in the trial management system of the foregoing arrangement, when a false electronic key is inputted a predetermined number of times, the remaining period or number of use available for trial is cleared ("0").

With this arrangement, a user's attention is drawn to a potential unauthorized act by suspending use of the function.

A trial management system according to the present invention may have an arrangement in which, in the trial management system of the foregoing arrangement, the specified key includes the one (an authorized key) to terminate a trial period and proceed to a state of authorized use.

With this arrangement, even when in a trial period, by purchasing and inputting an authorized number, a user can continue using the function program as before.

A trial management system according to the present invention may have an arrangement in which, in the trial management system of the foregoing arrangement, when a system configuration unit which is essential to operating a trial mode turns into a non-operational state (failure, detachment or the like), the trial is interrupted.

With this arrangement, a trial is arranged to be performed in a correct operation environment, thereby allowing a user to correctly understand the target function program during trial.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A trial management system, comprising:
    a storage section storing one or more functions that are to be trial targets;
    a trial instruction giving section for receiving a user's instruction on a trial for at least one function of the functions;
    a specifying section for specifying the at least one function, a trial of which is started, according to the instruction received by said trial instruction giving section; and
    a control section for setting a trial period for the trial of the function specified by said specifying section in accordance with the instruction received by said trial instruction giving section,
    wherein if said control section detects expiration of the trial period for the function during execution of a job thereof, the trial period for the function being set according to the instruction received by said trial instruction giving section, then said control section postpones the expiration of the trial period for the function until the time the job of the function is actually completed and if said control section detects expiration of the trial period for the function when no job is being executed, the trial period expires with no postponement.

2. The trial management system set forth in claim 1, wherein said trial instruction giving section receives the user's instruction in the form of input of a trial key associated with each function.

3. The trial management system set forth in claim 2, wherein:
    the trial key includes data of said function itself and trial-use limitations imposed thereon, and
    when the trial key is inputted to said trial instruction giving section, said control section sets the trial period for the function specified by the trial key received by said trial instruction giving section according to the trial-use limitations indicated by the trial key received by said trial instruction giving section.

4. The trial management system set forth in claim 2, wherein the trial key includes a trial key in the form of a start trial button, and a trial key in the form of an electronic key which is a code to release a program subject to access-protect from the access-protect.

5. The trial management system set forth in claim 1, wherein said control section judges whether or not the function specified in the instruction received by said trial instruction giving section is operational, and sets only those which are operational to be available in a trial mode.

6. The trial management system set forth in claim 1, wherein said control section changes the trial period for said function.

7. The trial management system set forth in claim 6, wherein:
    said trial instruction giving section receives the user's instruction in the form of a specified key associated with the trial period of each function, and
    said control section sets the trial period of the function according to data of the trial period indicated by the specified key received by said trial instruction giving section.

8. The trial management system set forth in claim 7, wherein said control section judges whether or not the specified key received by said trial instruction giving section indicates data which extends the trial period, and extends the trial period for the function specified by said trial instruction giving section when the specified key indicates the data which extends the trial period.

9. The trial management system set forth in claim 7, wherein said control section judges whether or not the specified key received by said trial instruction giving section indicates correct data, and when an incorrect specified key is inputted a predetermined number of times, said control section terminates the trial period for the function specified by said trial instruction giving section.

10. The trial management system set forth in claim 7, wherein said control section judges whether or not the specified key is an authorized key which gives an instruction to terminate the trial period so as to proceed to a state of authorized use, and when the specified key received by said trial instruction giving section is the authorized key, said control section terminates the trial period for the function specified by said trial instruction giving section and proceeds to the state of authorized use.

11. The trial management system set forth in claim 7, wherein said control section judges whether or not an environment which is essential to carrying out the function received by said trial instruction giving section is completely available, and when the environment essential to carrying out the function received by said trial instruction giving section is not completely available, said control section terminates the trial period for the function specified by said trial instruction giving section.

12. The trial management system set forth in claim 1, wherein said trial instruction giving section is an operation panel which is provided with a key group for receiving the user's instruction and a display section for displaying guidance information including a process status with respect to the user.

13. The trial management system set forth in claim 12, wherein:
    said storage section stores a plurality of functions to be trial targets, and
    said display section displays a list of some of said plurality of functions which are confirmed as available.

14. The trial management system set forth in claim 13, wherein said display section displays a list of trial periods for the respective functions together with the list of some of said plurality of functions available.

15. The trial management system set forth in claim 1, further comprising a communications board for sending inputted image information to an external device which is a transmission destination, under the control of said specifying section.

16. The trial management system set forth in claim 1, further comprising a scanner for scanning a desired document image as image information, under the control of said specifying section.

17. The trial management system set forth in claim 1, further comprising an image processing unit for performing predetermined image processing with respect to inputted image information, under the control of said specifying section.

18. The trial management system set forth in claim 1, further comprising a storage device for temporarily storing image information, under the control of said specifying section.

19. The trial management system set forth in claim 1, further comprising a printer for printing out inputted image information.

20. The trial management system set forth in claim 1, further comprising a network scanner function as one of the functions to be the target of trial, whereby image data scanned by a device is transferred to another.

21. The trial management system set forth in claim 1, further comprising an e-mail function as one of the functions to be the target of trial, whereby scanned image data is transmitted in the form of an attachment file of an e-mail.

22. The trial management system set forth in claim 1, further comprising a security function as one of the functions to be the target of trial, whereby image data once printed out is erased.

23. A program tangibly embodied on a computer-readable medium which causes a computer to function as a control section in a trial management system, the trial management system including:
a storage section storing one or more functions that are to be trial targets;
a trial instruction giving section for receiving a user's instruction on a trial for at least one function of the functions;
a specifying section for specifying the at least one function, a trial of which is started, according to the instruction received by said trial instruction giving section, wherein
said control section sets a trial period for the trial of the function specified by said specifying section in accordance with the instruction received by said trial instruction giving section, and
if said control section detects expiration of the trial period for the function during execution of a job thereof, the trial period for the function being set according to the instruction received by said trial instruction giving section, then said control section postpones the expiration of the trial period for the function until the time the job of the function is actually completed and if said control section detects expiration of the trial period for the function when no job is being executed, the trial period expires with no postponement.

24. A computer-readable recording medium, wherein recorded is a program for causing a computer to function as a control section in a trial management system, the trial management system including:
a storage section storing one or more functions that are to be trial targets;
a trial instruction giving section for receiving a user's instruction on a trial for at least one function of the functions;
a specifying section for specifying the at least one function, a trial of which is started, according to the instruction received by said trial instruction giving section, wherein
said control section sets a trial period for the trial of the function specified by said specifying section in accordance with the instruction received by said trial instruction giving section, and
if said control section detects expiration of the trial period for the function during execution of a job thereof, the trial period for the function being set according to the instruction received by said trial instruction giving section, then said control section postpones the expiration of the trial period for the function until the time the job of the function is actually completed and if said control section detects expiration of the trial period for the function when no job is being executed, the trial period expires with no postponement.

25. A trial management system, comprising:
a storage section storing one or more functions that are to be trial targets;
a user input section supplied with a user's instruction on a trial for at least one of the functions; and
a processing section for specifying the at least one function, a trial of which is started, according to the instruction supplied to the user input section and for setting a trial period for the trial of the specified function in accordance with the instruction supplied to the user input section,
wherein if the processing section detects expiration of the trial period for the function during execution of a job thereof, the trial period for the function being set according to the instruction supplied to user input section, then the processing section postpones the expiration of the trial period for the function until the time the job of the function is actually completed and if the processing section detects expiration of the trial period for the function when no job is being executed, the trial period expires with no postponement.

* * * * *